Dec. 13, 1966 J. J. HICKEY 3,292,031
ANODE CAPACITOR AND SUPPORT FOR IMAGE CONVERTER CAMERA TUBE
Filed May 27, 1963
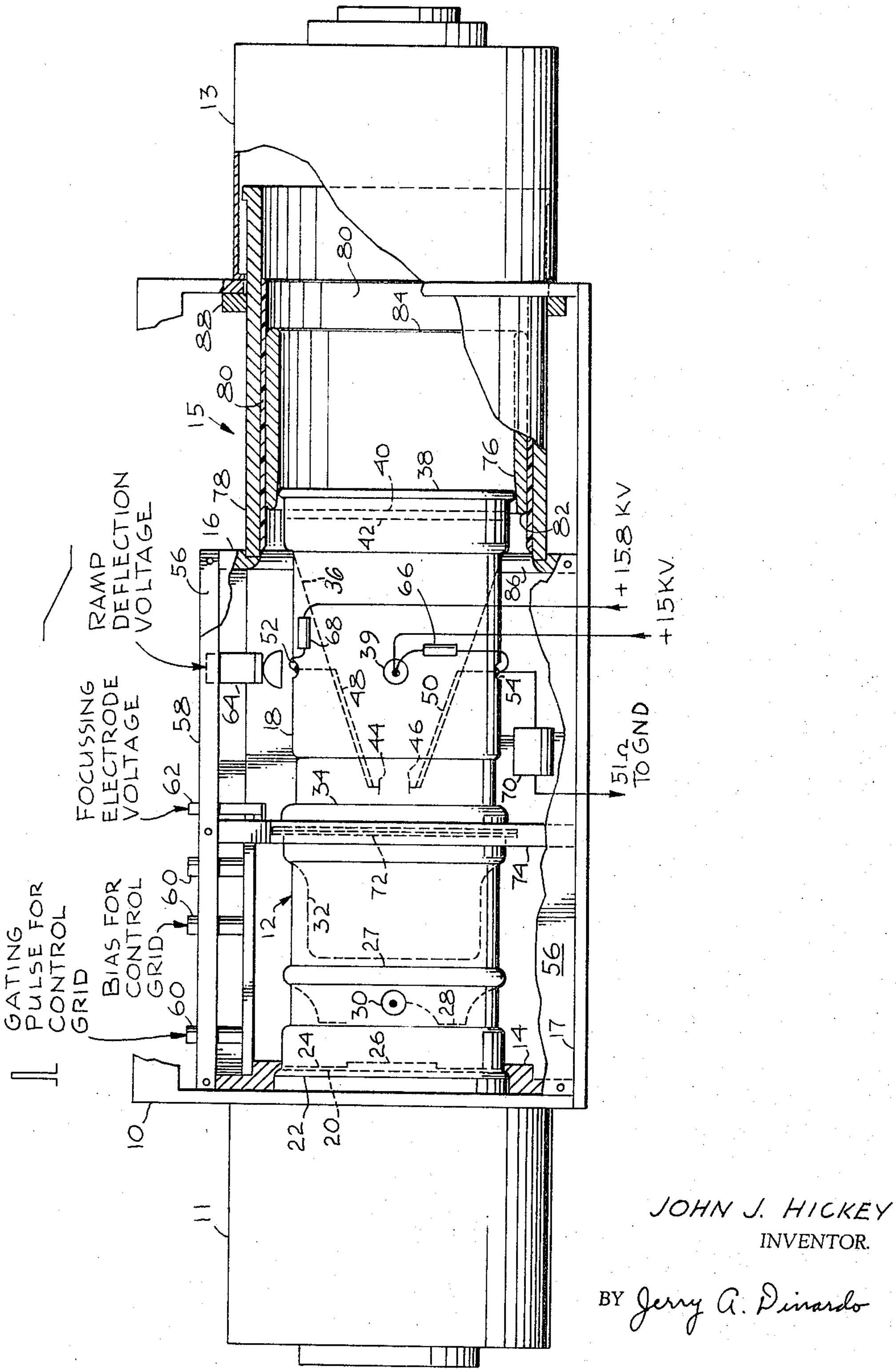
JOHN J. HICKEY
INVENTOR.
BY Jerry A. Dinardo
AGENT 3,292,031

ANODE CAPACITOR AND SUPPORT FOR IMAGE CONVERTER CAMERA TUBE

John J. Hickey, Hawthorne, Calif., assignor, by mesne assignments, to TRW Inc., a corporation of Ohio
Filed May 27, 1963, Ser. No. 283,423
5 Claims. (Cl. 315—3)

This invention relates to improvements in electronic camera systems employing image converter tubes and particularly to means for maintaining the high voltage on the accelerating anode constant during picture exposure.

One type of electronic camera system for photographing ultrahigh speed luminous transient phenomena employs an electrostatically operated image converter camera tube. The image converter camera tube serves both as a high speed electronic shutter and as a means for amplifying the light image being photographed. The image converter camera tube comprises a photocathode for converting the light image into a corresponding electron image, a control grid for gating the electron image, a generally cylindrical focussing electrode for electrostatically focussing the electron image onto a fluorescent screen, a conical accelerating anode for accelerating the electron image towards the fluorescent screen and causing the impinging electrons to produce a fluorescent light image, and a pair of electrostatic deflection plates for moving the electron image, and thus the light image across the fluorescent screen.

According to one mode of operation, a streak picture may be taken by deflecting the electron image during the application of a gating pulse on the control or gating grid. In accordance with another mode of operation, a series of rapidly recurring frames or pictures may be taken by applying a series of gating pulses to the control grid and deflecting the electron image during the intervals between the gating pulses.

In order to keep the fluorescent light image in focus during streak or frame operation, it is necessary to maintain the high voltage on the accelerating anode constant. In the past, this has been accomplished by connecting a commercially available capacitor between the accelerating anode and the photocathode. However, this solution has not proven to be entirely satisfactory for several reasons. In the first place, it has given rise to high voltage corona problems that are not readily solved. Secondly, it is found that a relatively high inductance is introduced between the accelerating anode and the photo-cathode, which inductance combines with the capacitance between said elements to form a ringing circuit which, when excited by fast rising pulses in the gating grid circuit, causes fluctuations in the accelerating anode voltage.

It is therefore an object of the present invention to eliminate fluctuations in the accelerating anode voltage of an image converter camera tube.

A further object is the provision of means coupled between the accelerating anode and the photocathode of an image converter camera tube for maintaining a constant anode voltage without introducing corona effects.

The foregoing and other objects are realized according to the invention by incorporating a capacitor assembly as part of the supporting structure for the image converter camera tube. In an embodiment of the invention, the capacitor assembly comprises two concentric metallic cylinders spaced by a solid dielectric and coaxially surrounding the anode end of the tube. The inside surface of the inner cylinder is tapered to provide a snug fit over the external metal flange that forms a part of the accelerating anode structure. A metal support plate, standing vertically with respect to horizontally extending camera tube, has a circular opening through which the anode end of the camera tube extends. The outer cylinder of the capacitor assembly fits into a recessed flange in the circular opening of the support plate.

A metal enclosure surrounding the tube between the photocathode and the vertical support plate provides a low inductance connection between the capacitor assembly and the photocathode. The relatively large size of the capacitor assembly gives a capacitance value several times that obtainable with previously used commercially available capacitors. The ends of the capacitor cylinders are rounded to avoid corona effects. The snug fit of the capacitor assembly between the anode flange and the vertical support plate serves to center the camera tube within the circular opening in the support plate.

The single figure of the drawing is a front elevation partly in section showing an image converter camera employing a capacitor assembly according to the invention.

Referring to the drawing, there is shown a metal cabinet 10 for housing an image converter camera tube 12. For simplicity, certain other components used in conjunction with the camera tube 12 for photographing high speed luminous transient phenomena are omitted. These components may include, for example, an input lens system in a lens housing 11 for focussing the incoming light image onto the photocathode of the camera tube and an output lens system, in a lens housing 13, and a photographic film for projecting and recording the amplified light image appearing on the fluorescent screen of the camera tube.

The camera tube 12 is supported horizontally at one end by a vertical metallic support plate 14 and at the opposite end by a capacitor assembly 15 attached to a vertical metallic plate 16, both plates 14 and 16 being secured to the base of the cabinet or chassis 17. The envelope 18 of the camera tube 12 is closed at one end thereof by a transparent window 20, made of glass, for example. The window 20 is sealed to a metallic flange 22 that forms a part of the envelope structure. A ring-like conductive coating 24 is disposed on the inside surface of the window 20, with the peripheral edges of the coating in contact with the metallic flange 22. On the central portion of the inside surface of the window 20 is a photo-emissive coating or photocathode 26 in peripheral contact with the ring-like conductive coating 24. The metallic flange 22 provides external connection to the photocathode 26.

Mounted on a flange 27 adjacent to the photocathode 26 is a wire grid 28 that serves as a control grid for gating the electrons emitted from the photocathode 26. External connection to the control grid 28 is made through a small metal cap 30 recessed in the tube envelope 18. A cylindrical focussing electrode 32 is mounted with one end adjacent to the control grid 28 and the other end mounted in a metal flange 34 sealed to adjacent envelope portions. The metal flange 34 provides external connection to the focussing electrode 32.

Adjacent to the focussing electrode 32 is a conical accelerating anode 36 which terminates in a metal flange 38 sealed to the end of the envelope 18. A recessed metal cap 39 sealed in the envelope 18 provides external connection to the anode 36. Inside the flange 38 and closing the end of the envelope 18 is a transparent window 40. The inside surface of the window 40 is coated with a fluorescent screen material 42 which is conductively connected to the flange 38 to maintain it at the same potential as the anode 36.

A pair of deflection plates 44 and 46 are mounted within the anode 36 near the smaller end thereof. The deflection plates 44 and 46 are insulatingly supported in the anode 36 wall and connected through leads 48 and 50 to recessed metal caps 52 and 54 sealed in the envelope 18.

A metal enclosure 56 secured to the chassis 17 and to the metal support plates 14 and 16 surrounds the entire envelope 18 except for the anode flange 38. The metal enclosure 56 includes a metal block 58 extending across the top thereof for locating coaxial cable connectors 60, spring clip connector 62, and associated cables, not shown, which supply the operating voltages for the camera tube 12.

Typical voltages supplied to the tube 12 include −110 volt bias for the control grid 30, a 300 volt positive D.C. rectangular gating pulse for the control grid 30, +1.4 kilovolts to the focussing electrode 32, a negative 3 kilovolt linear ramp deflection voltage through a capacitor 64 to the upper deflection plate 44. The photo-cathode 26 is grounded to the cabinet 10 through the metal support plate 14. A positive D.C. voltage of 15 kilovolts is applied to the anode 36 by way of metal cap 39, and through a 10 megohm resistor 66 to the lower deflection plate 46 by way of metal cap 54. A positive D.C. voltage of 15.8 kilovolts is applied through a 10 megohm resistor 68 to the upper deflection plate 44 by way of metal cap 52. A capacitor 70 is connected between the lower deflection plate 46 by way of metal cap 54 and ground through a 51 ohm resistor, not shown, to decouple the ramp voltage, applied to the upper deflection plate 44, from the lower deflection plate 46.

A capacitor assembly 72 is mounted around the periphery of the finage 34 of the focussing electrode 32. The capacitor assembly 72 includes a rigid metal supporting plate 74 to which the metal enclosure 56 is attached.

The details of the capacitor assembly 72 and its purpose are more fully disclosed in copending application of John J. Hickey entitled, "Image Converter Tubes, Including Focussing Electrode Decoupling Capacitance," Serial No. 228,948, filed October 8, 1962 now Patent No. 3,177,390. It will suffice to say that the function of the capacitor assembly is to decouple the focussing electrode 32 and deflection plates 44 and 46 and their circuits from the control grid 28 gating pulse, by shunting to ground a major portion of the gating pulse that couples to the focussing electrode 32 through interelectrode capacitance.

In accordance with the invention, the capacitor assembly 15 encircling the anode flange 38 comprises an inner conductive cylinder 76 and an outer conductive cylinder 78 concentric therewith and spaced therefrom by a dielectric member 80. The inside surface of the inner cylinder 76 is tapered so that the inner diameter of one end 82 of the cylinder 76 is slightly larger than the maximum diameter of the anode flange 38, and the inner diameter of the other end 84 of the cylinder 76 is slightly smaller than the maximum diameter of the anode flange 38. Thus, in mounting the inner cylinder 76 on the anode flange 38, the larger end 82 is slipped over the anode flange 38 and moved axially until the cylinder 76 fits around the anode flange 38.

The outer cylinder 78 is mounted in an opening 86 in the vertical support plate 16. The outer cylinder 78 fits into an annular recess formed on one side of the plate 16. The outer cylinder 78 extends some distance beyond the cabinet 10 so that it can accommodate an output lens and film holder to record the light images produced on the fluorescent screen 42. A retaining ring 88 mounted on the outer cylinder and bearing aginst the inside surface of the cabinet holds the capacitor assembly 15 in place.

The outer cylinder 78 is appreciably longer than the inner cylinder 76 and the adjacent ends of the two cylinders 76 and 78 are spaced apart by sufficient apart by sufficient distances to prevent high voltage arc-over therebetween. In furtherance of the prevention of arc-over, the dielectric member 80 extends beyond the ends of the inner cylinder 76. In addition, the corners in the plate opening 86 are rounded, and the ends 82 and 84 of the inner cylinder are rounded to prevent corona as well as arc-over.

The dielectric member 80 may consist of a coating that is bonded to the inner surface of the outer cylinder, such as an epoxy resin. Alternatively, it may consist of a preformed cylinder, such as polystyrene, or of several layers of flexible plastic, such as polyethylene terephthalate.

Preferably, the vertical support plate 16 and the two cylinders are made of aluminum, as are the mounting block 58, metal enclosure 56, and cabinet 10.

The capacitor assembly 15 provides a low inductance, high capacitance between the anode 36 and photocathode 26 which maintains the high voltage on the anode 36 constant during the operation of the camera tube. The capacitance is several times that obtainable with commercially available capacitors. A low inductance connection between the capacitor assembly 15 and the photocathode 26 is provided through the enclosure 56.

In addition to its high capacitance, the capacitor assembly 15 serves as a support and centering means for the camera tube 12. Furthermore, the outer cylinder 78, the support plate 16, and the metal enclosure 56 combine to form an effective light shield that prevents external light from reaching the camera tube 12 and hindering the operation thereof.

The embodiments of the invention in which an exclusive property or privilege is claimed are defined as follows:

1. In combination:
an image converter camera tube provided with a photocathode, a control grid and an annular anode spaced in that order along an axis;
a cylindrical capacitor assembly mounted concentrically about said annular anode and including two dielectrically spaced concentric metal cylinders, with the inner cylinder in peripheral contact with said anode;
and means forming a low inductance connection between the outer metal cylinder and said photocathode, said means including a metal enclosure surrounding said tube and extending along the axial length separating said outer metal cylinder and said photocathode.

2. The invention according to claim 1 wherein said metal cylinders are spaced by an insulation coating bonded to the inside surface of the outer metal cylinder.

3. In combination:
an image converter camera tube provided with a photocathode, a control grid and an annular anode spaced in that order along an axis;
a cylinder capacitor assembly mounted concentrically about said annular anode and including two dielectrically spaced concentric metal cylinders, with the inner cylinder provided with a tapered inside surface in peripheral contact with said anode;
and means forming a low inductance connection between the outer metal cylinder and said photocathode, said means including a metal enclosure surrounding said tube and extending along the axial length separating said outer metal cylinder and said photocathode.

4. In combination:
an image converter tube provided with a photocathode, a control grid and an annular anode;
a chassis supporting said tube;
a cylindrical capacitor assembly mounted concentrically about said annular anode and including two concentric metal cylinders spaced by a dielectric member, with the inner cylinder in peripheral contact with said anode, said dielectric member extending beyond the ends of the inner cylinder;
and means forming a low inductance connection between the outer metal cylinder and said photocathode, said means including a metal support plate secured to said chassis and provided with an opening in which one end of the outer metal cylinder is mounted, and a light opaque metal enclosure extending between and conductively connected to said photocathode and said support plate.

5. In combination:

an image converter tube provided with a photocathode, a control grid and an annular anode;

a chassis;

a first metal support plate secured to said chassis and supporting the end of said image converter tube adjacent said photocathode;

means conductively connecting said first support plate and said photocathode;

a second metal support plate secured to said chassis and provided with an opening through which extends the end of said image converter tube adjacent said anode;

a cylindrical capacitor assembly mounted concentrically about said annular anode and including two dielectrically spaced concentric metal cylinders, with the inner cylinder in peripheral contact with said anode and with one end of the outer cylinder secured in the opening in said second metal support plate;

and means forming a low inductance connection between the outer metal cylinder and said photocathode, said means including a metal enclosure surrounding said tube and extending between and secured to said metal support plates.

References Cited by the Examiner

UNITED STATES PATENTS

| | | | |
|---|---|---|---|
| 2,428,554 | 10/1947 | Cassen | 315—41 X |
| 2,771,566 | 11/1956 | Baracket | 315—59 X |
| 2,834,889 | 5/1958 | Fries | 313—65 X |
| 3,078,389 | 2/1963 | Corry | 315—58 X |

JAMES W. LAWRENCE, *Primary Examiner.*

P. C. DEMEO, *Assistant Examiner.*